United States Patent
Warmolts et al.

(10) Patent No.: US 6,666,636 B2
(45) Date of Patent: Dec. 23, 2003

(54) REMOVABLE DEEP SET DROP-IN ANCHOR

(75) Inventors: Jeffrey C. Warmolts, Glen Ellyn, IL (US); Timothy M. Moran, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 16 days.

(21) Appl. No.: 10/128,402

(22) Filed: Apr. 23, 2002

(65) Prior Publication Data

US 2003/0198529 A1 Oct. 23, 2003

(51) Int. Cl.⁷ .................................. F16B 13/06
(52) U.S. Cl. ......................... 411/57.1; 411/325
(58) Field of Search ...................... 411/54, 54.1, 56, 411/57.1, 60.1, 60.2, 321–323, 325

(56) References Cited

U.S. PATENT DOCUMENTS

| 4,235,151 A | * | 11/1980 | Udert et al. ............ 411/57.1 |
| 4,690,597 A | * | 9/1987 | Liebig .................. 411/32 |
| 4,917,552 A | | 4/1990 | Crawfprd |
| 4,976,577 A | * | 12/1990 | Brown et al. ........... 411/271 |
| 5,116,176 A | | 5/1992 | Yousuke |
| 5,702,216 A | * | 12/1997 | Wu ..................... 411/32 |

* cited by examiner

Primary Examiner—Flemming Saether
Assistant Examiner—Jori Schiffman
(74) Attorney, Agent, or Firm—Lisa M. Soltis, Esq.; Mark W. Croll, Esq.; Welsh & Katz, Ltd.

(57) ABSTRACT

A drop-in anchor includes a sleeve having a threaded region having an internal thread formed therein and a split region having at least two longitudinal channels formed therein. The channels define sections. The split region has inwardly tapered inner walls. A plug is configured for engagement with the sleeve at the split region. The plug has a top surface and defines a tapered shape. A bolt having a threaded portion and a through-bore extending longitudinally therethrough, is configured for threaded engagement with the sleeve threaded region. A setting member is configured for insertion into the bolt bore. The setting member engages the plug top surface and a force exerted on the setting member drives the plug into the sleeve split region so as to urge the split region sections axially outwardly. A method for securing the anchor in the opening in the structure is also disclosed.

17 Claims, 1 Drawing Sheet

REMOVABLE DEEP SET DROP-IN ANCHOR

BACKGROUND OF THE INVENTION

The present invention pertains to drop-in anchors. More particularly, the present invention pertains to a deep set drop-in anchor that properly self-sets even in deeply drilled bores, and is readily removable so that no portion of the anchor extends exteriorly from the structure after use.

Various types of anchors are in wide-spread use in the construction industry. Typically these anchors are used to provide a means to anchor or secure an object to a structure, such as a wall or floor. In many applications, the object is secured to a solid (e.g., concrete) structure. These anchors are inserted into an opening (e.g., a bore or hole) in the structure and engage the walls of the opening. The anchors can be either removable or non-removable, e.g., permanent.

Removable anchors are used, in one application, for temporary supports in tilt-wall construction. In such a use, the anchor is used to secure a shoe to a concrete floor that is temporarily brace a wall as wall is being lifted or tilted into position. In this application, once the wall is set and secured in place, the shoe must be removed, as does any part of the anchor that is above the surface of the floor.

Anchors are known that include a split sleeve having inwardly tapered lower wall an upper threaded portion. A plug is forced into engagement with the tapered lower walls to frictionally engage the sleeve with the walls of the opening. A bolt or threaded rod is, then engaged with the sleeve threads to secure the bolt or rod with the anchor.

Another known type of removable anchor is a pin drive anchor. This type of anchor uses a sleeve that is inserted into a hole or bore formed in the structure. A sectioned or split plug having a reduced diameter is inserted into the sleeve and is set into place by forcing a setting pin or tool against the plug element. The force on the pin urges the sleeve outwardly to engage the inner walls of the bore. The sleeve can include threads for receiving a bolt or like threaded fastener.

Still another type of removable anchor is a coil anchor. The type of anchor includes a threaded shank and a coil that is wound around a portion of the thread. The shank and coil are inserted into a bore having a predetermined depth. The shank is rotated so that the coil engages the walls of the bore while it is engaged by the shank threads.

One type of non-removable anchor, referred to as a wedge anchor, includes a split sleeve with a reversed tapered wedge element formed at the end of a threaded shank. The sleeve and shank element are inserted into the bore and the shank is pulled so that the reversed tapered sides of the wedge engage the sleeve and urge the sleeve portions outwardly to engage the inner walls of the bore.

Each of these types of anchors has its drawbacks. First, the wedge anchor cannot be removed after it is installed. Although this type of anchor has a high pull-out strength, it cannot be used in applications where the anchor is used in a temporary installation and is removed after use.

The pin drive anchor, although in wide-spread use, must be used with a tool or pin of a predetermined length. In addition, these anchors typically have a limited depth to which they can be installed. This results in reduced loading capabilities.

Like the pin drive anchor, the coil anchor also has limitations vis-a-vis anchor depth and coil engagement with the bore walls. If the bore depth is too great, and the anchor is not properly set, the shank may not fully engage the coil, thus resulting in less than intended load levels. In addition, these anchors typically require that a high torque be applied to the bolt to properly set the anchor.

Accordingly, there exists a need for a drop-in anchor that can be removed after use. Desirably, such an anchor includes a wedge or plug that can be properly set within a sleeve regardless of the depth at which the anchor is set. Most desirably, such an anchor uses bolt for both setting the plug (e.g., as a setting tool) and securing an object to the structure in which the anchor is set. Also most desirably, the anchor can be used with a standard a reusable bolt.

SUMMARY OF THE INVENTION

A drop-in anchor includes a partially threaded sleeve, a plug, a threaded shank having a through-bore and a setting member or tool. The present drop-in anchor provides a fastening system in which the fastening member (e.g., the bolt) can be removed after use so that no part of the fastening member does not extends from the structure after removal, in which the anchor is installed.

The anchor sleeve has a threaded region and a split region having at least two longitudinal channels formed therein. The channels define sections. In a current embodiment, the split region has four longitudinal channels defining four substantially identical sections. The split region has inwardly tapered inner walls.

The plug is configured for engagement with the sleeve at the split region. The plug has a top surface and defining a tapered shape. Preferably, the taper of the plug complements the tapered inner walls of the sleeve split region.

A shank, preferably formed as a shoulder bolt, has a threaded portion and a through-bore extending longitudinally therethrough. The threaded portion is configured for threaded engagement with the sleeve threaded region. In the preferred embodiment in which a shoulder bolt is used, the bolt shoulder is configured to engage an upper lip of the sleeve to assure proper positioning of the bolt in the sleeve.

The setting member is configured for insertion into the bolt through-bore. The setting member engages the plug top surface. A force exerted on the setting member drives the plug into the sleeve split region so as to drive the split region sections axially outwardly.

The setting member can be formed as a pin having a head. Striking the setting member head drives the setting member head into contact with the bolt head and drives the plug into the split region sections which drives the sections axially outward. This secures the anchor in the structure.

A method for securing an anchor in an opening in a structure is also disclosed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
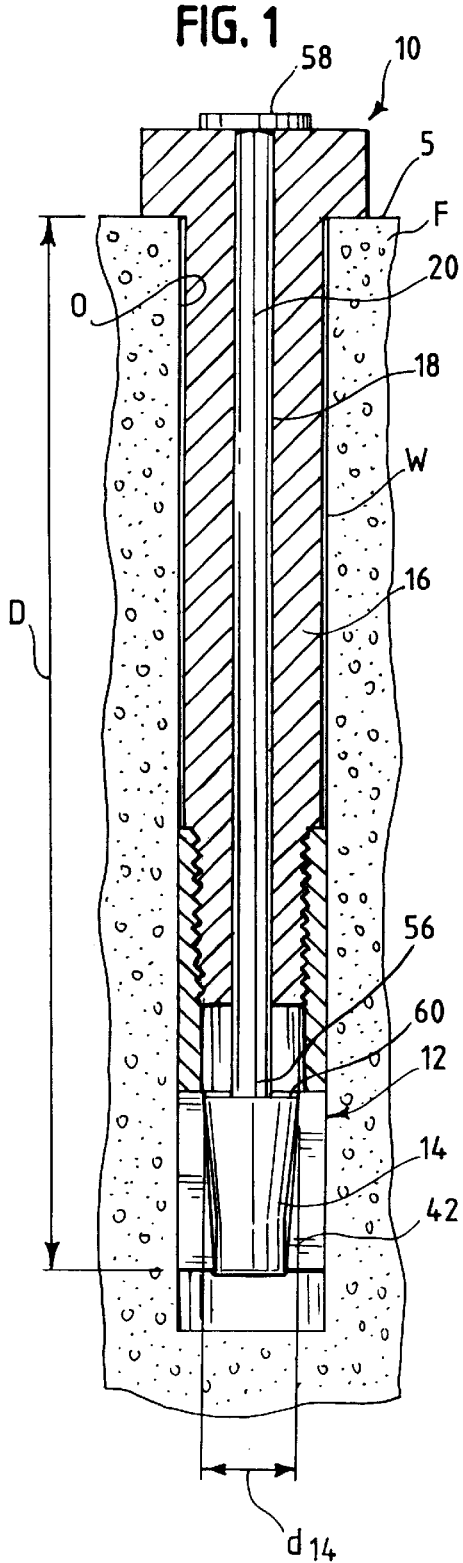
FIG. 1 is a cross-sectional view of a drop-in anchor embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring now to the figures and in particular to FIG. 1 there is shown a deep-set drop-in anchor 10 embodying the principles of the present invention. The anchor 10 includes a shell or sleeve 12, a plug 14, a threaded shank 16 having a bore formed longitudinally there in, indicated at 18, and a setting pin 20.

The anchor 10 is removably set in a structure, such as in an opening O in a concrete floor or wall F. That is, any part or portion of the anchor 10 that would otherwise extend above the surface S of the structure F can be removed after use. This is particularly desirable where the anchor 10 is used in a temporary supporting arrangement as is required in tilt-wall construction.

It has been found that the present deep-set anchor 10 provides high holding values or pull-out loads with very little displacement until fracture occurs. In fact, tension loads as high as 20,000 pounds have been observed when the anchor 10 is used at a five inch embedment depth, as indicated at D in FIG. 1.

The sleeve or shell 12 is an annular element having a threaded region 22 and a split region 24. An outer wall 26 of the sleeve 12 has a constant diameter $d_{26}$ along the length l of the sleeve 12 from an upper lip 28 of the sleeve 12 to a lower lip 30 of the sleeve 12, through both the threaded region 22 and the split region 24. For purposes of the present disclosure, upper and lower are used in reference to the orientation in which the parts will reside when the anchor is installed in a floor structure.

Figure 2:
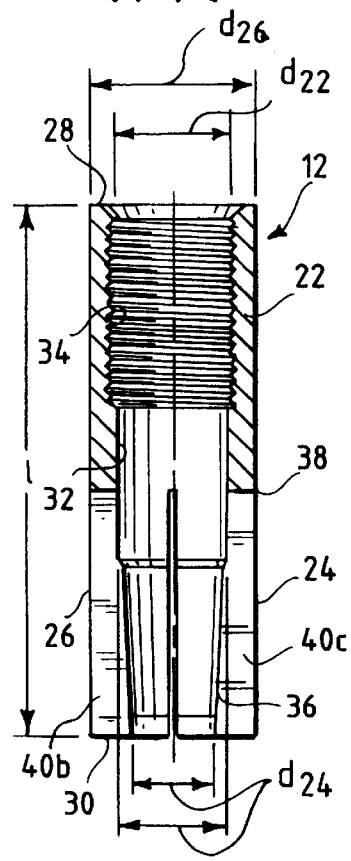
FIG. 2 is a cross-sectional view of the anchor sleeve.
Figure 5:
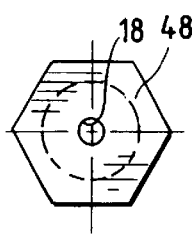
FIG. 5 is a top view of the shoulder bolt illustrating the through bore opening in the top of the bolt head.
Figure 3:
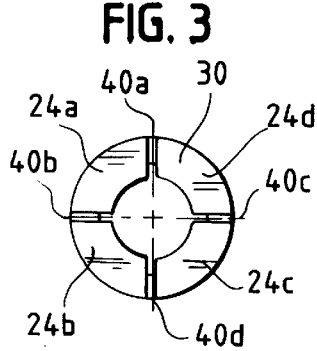
FIG. 3 is a bottom view of the sleeve, as viewing into the split section.
Figure 4:
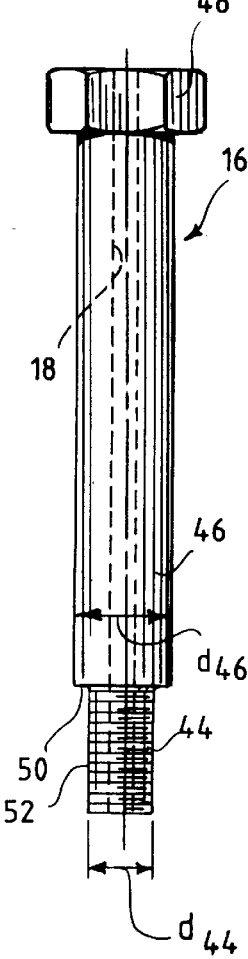
FIG. 4 is a cross-sectional view of the threaded shank or shoulder bolt.

An inner wall 32 of the sleeve 12 has a constant diameter $d_{22}$ at the threaded region 22 (taking into consideration the threads 34) and tapers inwardly through the split region 24, as indicated at 36. Thus, as seen in FIG. 2, the diameter $d_{24}$ across the inner wall 32 decreases from a point (indicated at 38) between the threaded region 22 and the split region 24 to the end of the split region 24, as at about the lower lip 30.

In a current embodiment, the split region 24 includes four elongated channels 40a–d extending longitudinally, dividing the split region 24 into four longitudinally extending sections 24a–d. The channels 40a–d are formed about equidistantly about the circumference of the sleeve 12, or at 90 degrees from adjacent channels. Those skilled in the art will recognize that other split patterns can be used in connection with the present anchor 10 without departing from the scope and spirit of the present invention.

The plug 14 has a tapered profile the defines tapered sides as indicated at 42 and is configured for insertion into the sleeve 12. The plug 14 "fits" within the split region 24 and can be formed having a taper 42 that complements the taper 36 of the sleeve 12, however, such matching tapers 36, 42 (i.e., taper angles) are not necessary. A greatest diameter $d_{14}$ of the plug 14 is, however, greater than the smallest diameter $d_{24}$ of the split region 24 (near the lower lip 30) so that the plug 14 interferingly fits within the sleeve 12.

The shank 16 includes a threaded end region 44, an intermediate region 46 and a head 48. In a current embodiment, the shank 16 is formed as a shoulder bolt, in which the threaded region 44 has a reduced diameter $d_{44}$ from the intermediate region $d_{46}$. As such, a shoulder 50 is formed at the juncture of the threaded region 44 and the intermediate region 46.

The threaded region 44 is formed with threads 52 that complement (i.e., threadedly engage) the sleeve threads 34. As such, as seen in FIG. 1, the shoulder bolt 16 threads into the upper end (e.g., threaded region 22) of the sleeve 12. The head 48 can be formed having a hexagonal shape, such as that of a convention bolt, to permit the use of conventional tools, wrenches, ratchets and the like, to (threadedly) engage and disengage the bolt 16 and sleeve 12.

The bolt 16 includes the through-bore 18 extending longitudinally therethrough. The bore 18 is configured for slidingly receiving the setting pin or like setting tool. The exemplary setting pin 20 includes a setting end 56 and head 58 opposing the setting end 56. The setting end 56 is configured for engaging the plug 14, and the head 58 is configured for being struck (as with a hammer) and for coming into contact with the bolt head 48.

In use, the plug 14 is inserted into the sleeve 12 and the bolt 16 is threaded into the sleeve 12 until the shoulder 50 engages the upper lip 28 of the sleeve 12. The anchor 10 is then inserted into the bore O in the structure F to a desired depth D. With the anchor 10 at the desired depth D, the pin 20 is inserted into the bolt bore 18, until the setting end 56 engages the plug 14. It will be recognized by those skilled in the art that the pin 20 can be inserted into the bolt 16 before installation of the anchor 10 in the structure bore O. It will also be recognized by those skilled in the art that prior to setting the anchor 10, the pin setting end 56 will rest on the plug top surface 60 and that the pin head 58 will not be fully seated on the bolt head 48. That is, the pin head 58 will be spaced from or above the bolt head 48.

With the entire assembly (i.e., sleeve 12, plug 14, bolt 16 and pin) 20 in place at the desired depth D in the bore O, the pin 20 is struck to drive the plug 14 into the sleeve 12. The tapered wall 42 of the plug and the taper 36 of the sleeve 12 engage one another which wedges the plug 14 in the sleeve 12. Because of the interfering fit between the plug 14 and the sleeve section 24a–d, the sleeve sections 24a–d are urged outwardly, into engagement with the walls W of the structure bore O. This sets or secures the sleeve 12 in place in the structure F.

Once the anchor 10 is set in the structure F, the pin 20 can be removed from the bolt 16 and the bolt 16 can be removed from the sleeve 12. The bolt 16 can be used, as part of the temporary support, or a more conventional (non-through-bore) bolt can be threaded into the sleeve 12 for the temporary support. The shoulder bolt 16 and setting pin 200 can then be reused for the installation of another sleeve 12. After use, the bolt 16 (which ever is used) can be removed from the sleeve 12 so that no part of the anchor 10 extends above the surface S of the structure F.

Those skilled in the art will recognize that in proper use, the anchor 10 (prior to setting) will be inserted in to the structure bore O so that the bolt head 48 is in contact with the surface S of the structure F. This will assure proper positioning (e.g., depth) of the anchor 10 in the structure F. Those skilled in the art will also appreciate that unlike with the use of coil anchors, over-drilling (the depth of) the structure bore O will have no adverse effect on the use or integrity of the anchor 10. As such, less consideration need be given to the maximum depth of the structure bore O.

A method for securing an anchor 10 in an opening O formed in a structure F includes inserting the tapered plug 14 into the sleeve 12 and threading a shoulder bolt 16 into the sleeve 12 until the shoulder 50 contacts the upper lip 28 of the sleeve 12. The sleeve 12 and bolt 16 are positioned the opening O in the structure F. The setting pin 20 is inserted in the bolt through-bore 18, and is then forced downward (as by striking with a hammer), toward and into contact with the top surface 60 of the plug 14. This drives the plug 14 into the split region 24, which in turn drives the split region sections 24a–d axially outwardly to secure the sleeve 12 in the opening O.

As will be appreciated by those skilled in the art, positioning the setting pin 20 in the bolt through-bore 18 can be carried out before or after the sleeve 12 and bolt 16 are positioned in the opening O in the structure F. Preferably, the anchor 10 is positioned in the opening O such that the bolt head 48 is positioned against a surface S of the structure F surrounding the opening O.

Still another advantage of the present anchor 10 is that it is readily inspectable. That is, because the plug 14 is properly set when the pin 20 is fully forced downward, by noting that the pin head 58 is flush with the bolt head, 48, it can be readily, visually determined that the anchor 10 is properly set.

All patents referred to herein, are hereby incorporated herein by reference, whether or not specifically do so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A drop-in anchor comprising:
    a sleeve having a threaded region having an internal thread formed therein and a split region having at least two longitudinal channels formed therein defining sections, the split region having inwardly tapered inner walls;
    a plug configured for engagement with the sleeve at the split region, the plug having a top surface and defining a tapered shape;
    a shank having a threaded portion and having a through-bore extending longitudinally therethrough, the threaded portion configured for threaded engagement with the sleeve threaded region; and
    a setting member, the setting member configured for insertion into the shank bore and for engagement with the plug top surface, wherein a force exerted on the setting member drives the plug into the sleeve split region so as to urge the split region sections axially outwardly.

2. The drop-in anchor in accordance with claim 1 wherein the split region has four longitudinal channels defining four sections.

3. The drop-in anchor in accordance with claim 1 wherein the shank is formed as a bolt having a head.

4. The drop-in anchor in accordance with claim 3 wherein the bolt is a shoulder bolt defining a shoulder at an end of the threaded region.

5. The drop-in anchor in accordance with claim 1 wherein the setting member has a head, and wherein the setting member head contacts the shank when the setting member is driven into the plug driving the split region sections axially outward.

6. The drop-in anchor in accordance with claim 1 wherein the shank is formed as a bolt having a head and wherein the setting member has a head, the setting member head being spaced from the bolt head before the setting member is driven into the plug driving the split region sections axially outward, and contacting the bolt head when the setting member is driven into the plug driving the split region sections axially outward.

7. The drop-in anchor in accordance with claim 6 wherein the bolt is a shoulder bolt.

8. The drop-in anchor in accordance with claim 3 wherein the bolt head is hexagonal.

9. A drop-in anchor comprising:
    a sleeve having a threaded region having an internal thread formed therein and a split region having at least four longitudinal channels formed therein defining four substantially identical sections, the sleeve having an upper lip, the split region having inwardly tapered inner walls;
    a plug configured for engagement with the sleeve at the split region, the plug having a top surface and defining a tapered shape;
    a shoulder bolt having a threaded portion, a head and an intermediate region between the threaded region and the head, the shoulder bolt defining a shoulder at the intermediate region, the shoulder bolt having a through-bore extending longitudinally therethrough, the threaded portion configured for threaded engagement with the sleeve threaded region, the shoulder bolt configured to that when the threaded portion is threadedly engaged with the sleeve, the shoulder rests on the sleeve upper lip; and
    a setting member, the setting member having an elongated body and a head, the elongated body configured for insertion into the shoulder bolt bore and for engagement with the plug top surface, the setting member head being spaced from the shoulder bolt head before the setting member is driven into the plug driving the split region sections axially outward, and contacting the bolt head when the setting member is driven into the plug driving the split region sections axially outward.

10. The drop-in anchor in accordance with claim 9 wherein the bolt head is hexagonal.

11. In an anchoring system having a drop-in anchor having a sleeve having a threaded region having an internal thread formed therein and a split region having at least two longitudinal channels formed therein defining at least two sections, the sleeve having an upper lip, the split region having inwardly tapered inner walls and a plug configured for engagement with the sleeve at the slit region, the plug having a top surface and defining a tapered shape and a setting member for urging against the top surface of the plug to drive the split region sections outwardly, the improvement comprising:

a bolt having a thread for threadedly engaging the sleeve threaded region and a through bore for receiving the setting member.

12. The anchoring system in accordance with claim 11 wherein the bolt has a head.

13. The anchoring system in accordance with claim 11 wherein the bolt head is hexagonal.

14. The anchoring system in accordance with claim 11 wherein the bolt is a shoulder bolt.

15. A method for securing an anchor in an opening formed in a structure, comprising the steps of:

inserting a plug having tapered walls and a top surface into a sleeve, the sleeve having a split region and a threaded region, the split region defining sections, the sleeve having an upper lip;

threading a shoulder bolt into the sleeve, the shoulder bolt defining a thread and a having a head and a shoulder, the bolt having a through-bore therein, the bolt being threaded so that the shoulder contacts the lip of the sleeve;

positioning the sleeve and the bolt in the opening in the structure;

positioning a setting member in the bolt through-bore;

forcing the setting member into contact with the top surface of the plug to drive the split region sections axially outward.

16. The method in accordance with claim 15 wherein the step of positioning the setting member in the bolt through-bore is carried out before the step of positioning the sleeve and the bolt in the opening in the structure.

17. The method in accordance with claim 15 wherein in the step of positioning of the sleeve and the bolt in the opening in the structure, the bolt head is positioned against a surface of the structure surrounding the opening.

* * * * *